(12) United States Patent
Kang

(10) Patent No.: US 12,488,768 B2
(45) Date of Patent: Dec. 2, 2025

(54) DISPLAY DEVICE PREVENTING MEMORY CONTROLLER ERROR DUE TO INSTANT VOLTAGE DROP, AND METHOD THEREFOR

(71) Applicant: LG ELECTRONICS INC., Seoul (KR)

(72) Inventor: Byeongkook Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/713,547

(22) PCT Filed: Nov. 26, 2021

(86) PCT No.: PCT/KR2021/017586
§ 371 (c)(1),
(2) Date: May 24, 2024

(87) PCT Pub. No.: WO2023/095957
PCT Pub. Date: Jun. 1, 2023

(65) Prior Publication Data
US 2025/0046270 A1    Feb. 6, 2025

(51) Int. Cl.
*G05G 5/00* (2006.01)
*G09G 5/00* (2006.01)
(52) U.S. Cl.
CPC ....... *G09G 5/006* (2013.01); *G09G 2330/026* (2013.01); *G09G 2354/00* (2013.01); *G09G 2370/16* (2013.01)

(58) Field of Classification Search
CPC ............ G09G 5/006; G09G 2330/026; G09G 2354/00; G09G 2370/16; G09G 2330/02; H04N 5/63; H04N 21/4425; H04N 21/443; H04N 21/4436; G06F 1/305
See application file for complete search history.

(56) References Cited

U.S. PATENT DOCUMENTS

| 2007/0127178 A1* | 6/2007 | Yoneda ..................... G06F 1/28 361/92 |
| 2014/0035596 A1 | 2/2014 | Lee et al. |
| 2014/0223161 A1 | 8/2014 | Kim |
| 2017/0177374 A1* | 6/2017 | Morning-Smith ...... G06F 1/263 |
| 2019/0035460 A1* | 1/2019 | Terada ............... G11C 13/0069 |

FOREIGN PATENT DOCUMENTS

| KR | 10-0502911 B1 | 7/2005 |
| KR | 10-2014-0017392 A | 2/2014 |
| KR | 10-2014-0099016 A | 8/2014 |
| KR | 10-2016-0128013 A | 11/2016 |

* cited by examiner

*Primary Examiner* — Pegeman Karimi
(74) *Attorney, Agent, or Firm* — Birch, Stewart, Kolasch & Birch, LLP

(57) ABSTRACT

The present disclosure: display device comprising: a power source supply receiving a supply of power from an external power source; and a processor for detecting the voltage of the power supplied to the power source supply, detecting a voltage drop of the supplied power on the basis of the detected voltage of the power, and, if a voltage drop is detected, resetting a power source of a memory controller within predetermined time and resetting a main power source.

10 Claims, 8 Drawing Sheets

DISPLAY DEVICE PREVENTING MEMORY CONTROLLER ERROR DUE TO INSTANT VOLTAGE DROP, AND METHOD THEREFOR

CROSS REFERENCE TO RELATED APPLICATIONS

This application is the National Phase of PCT International Application No. PCT/KR2021/017586, filed on Nov. 26, 2021, all of which is hereby expressly incorporated by reference into the present application.

BACKGROUND

Technical Field

The present invention relates to a display device, and more specifically, to a display device that prevents booting errors in a memory controller due to an instantaneous voltage drop.

Discussion of the Related Art

In recent years, display devices have been distributed worldwide. As display devices are widely distributed in various regions, various technologies are needed to ensure that the display devices operate stably.

In particular, there are cases in which power supply is not stable depending on the environments of a specific region or a specific country. That is, there may be cases in which the power supplied to the display device is unstable. When the power supplied to the display device is unstable, an instantaneous voltage drop may occur to cause problems in the operation of the display device.

Thus, a function that allows the display device to operate normally even when the instantaneous voltage drop occurs is needed.

SUMMARY OF THE DISCLOSURE

An object of the present disclosure is to provide a display device that is capable of preventing a non-booting error of a memory controller when an instantaneous voltage drop occurs in an unstable power supply situation.

A display device according to an embodiment of the present disclosure includes: a power source supply configured to receive power from an external power source; and a processor configured to detect a voltage of the power supplied from the power source supply, detect a voltage drop of the supplied power on the basis of the detected voltage of the power, and reset power of a memory controller and a main power source within a predetermined time when the voltage drop is detected.

Advantageous Effects

According to the embodiment of the present disclosure, even when the instantaneous voltage drop occurs in the unstable power supply situation, the non-booting error of the memory controller from being prevented from occurring.

In addition, according to the embodiment of the present disclosure, the display device may perform the communication with the memory controller to prevent the error from occurring after forcibly resetting the memory controller when the instantaneous voltage drop occurs in the unstable power supply situation.

DETAILED DESCRIPTION OF THE EMBODIMENTS

Hereinafter, embodiments relating to the present disclosure will be described in detail with reference to the accompanying drawings. The suffixes module and "unit" for components used in the description below are assigned or mixed in consideration of easiness in writing the specification and do not have distinctive meanings or roles by themselves.

Figure 1:
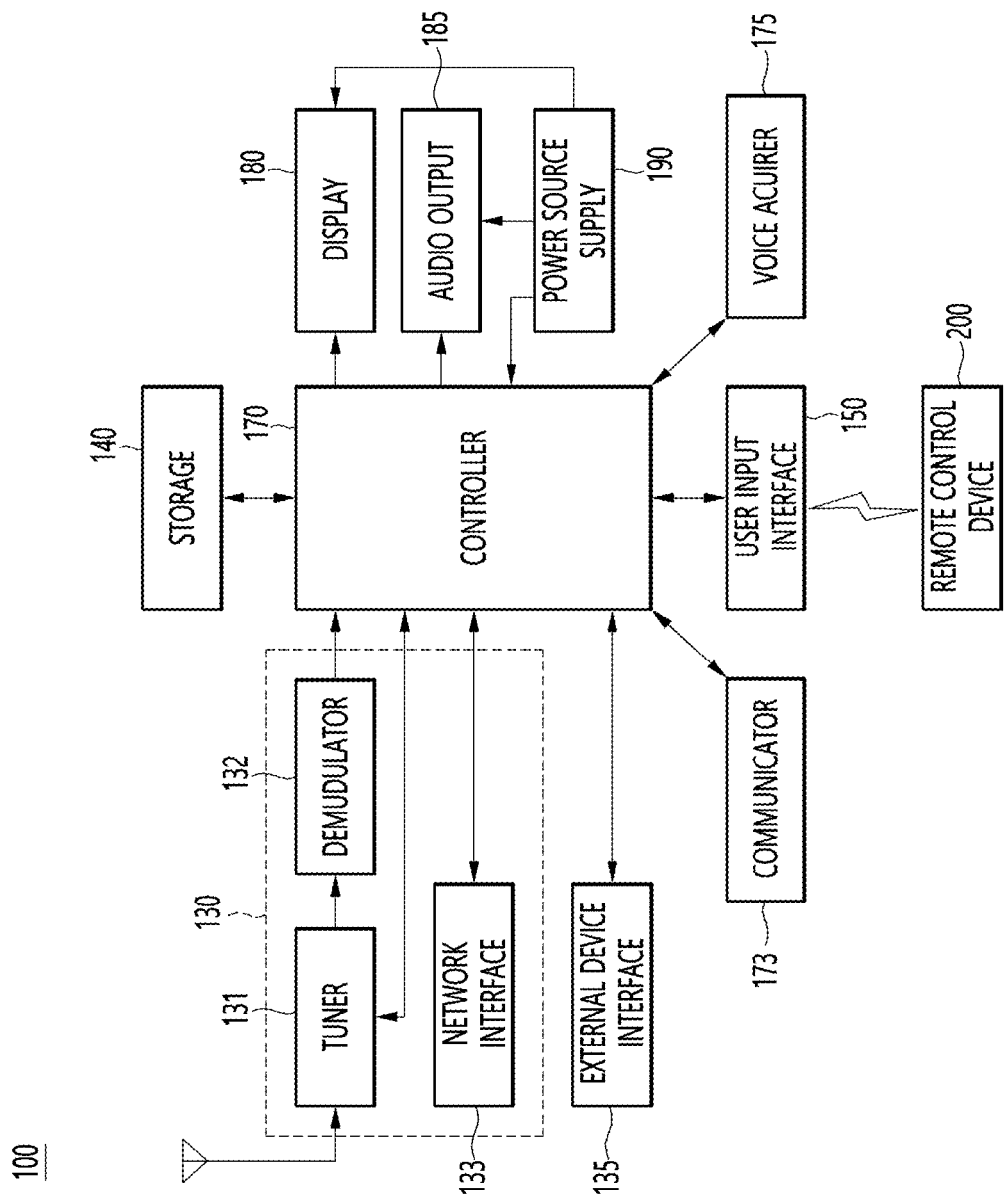
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 may include a broadcast reception module 130, an external device interface 135, a storage 140, a user input 150, a controller 170, a wireless communication interface 173, a display 180, an audio output 185, and a power source supply 190.

The broadcast reception module 130 may include a tuner 131, a demodulator 132, and a network interface 133.

The tuner 131 may select a specific broadcast channel according to a channel selection command. The tuner 131 may receive broadcast signals for the selected specific broadcast channel.

The demodulator 132 may divide the received broadcast signals into video signals, audio signals, and broadcast program-related data signals, and may restore the divided video signals, audio signals, and data signals into an output available form.

The network interface 133 may provide an interface for connecting the display device 100 to a wired/wireless network comprising internet network. The network interface 133 may transmit or receive data to or from another user or another electronic device through an accessed network or another network linked to the accessed network.

The network interface 133 may access a predetermined webpage through an accessed network or another network linked to the accessed network. That is, the network interface 133 may transmit or receive data to or from a corresponding server by accessing a predetermined webpage through the network.

The network interface 133 may receive content or data provided from a content provider or a network operator. That is, the network interface 133 may receive content, such as movies, advertisements, games, VODs, and broadcast signals, which are provided from the content provider or the network operator, and information relating thereto through the network.

In addition, the network interface 133 may receive firmware update information and update files provided from the network operator, and may transmit data to the Internet or content provider or the network operator.

The network interface 133 may select and receive a desired application among applications open to the air, through network.

The external device interface 135 may receive an application or an application list in an adjacent external device and deliver the application or the application list to the controller 170 or the storage 140.

The external device interface 135 may provide a connection path between the display device 100 and an external device. The external device interface 135 may receive at least one of an image or audio outputted from an external device that is wirelessly or wiredly connected to the display device 100 and deliver the received image or the audio to the controller. The external device interface 135 may include a plurality of external input terminals. The plurality of external input terminals may include an RGB terminal, at least one High Definition Multimedia Interface (HDMI) terminal, and a component terminal.

An image signal of an external device inputted through the external device interface 135 may be outputted through the display 180. A sound signal of an external device inputted through the external device interface 135 may be outputted through the audio output 185 (example, speaker).

An external device connectable to the external device interface 135 may be one of a set-top box, a Blu-ray player, a DVD player, a game console, a sound bar, a smartphone, a PC, a USB Memory, and a home theater system but this is just exemplary.

Additionally, some content data stored in the display device 100 may be transmitted to a user or an electronic device, which is selected from other users or other electronic devices pre-registered in the display device 100.

The storage 140 may store signal-processed image, voice, or data signals stored by a program in order for each signal processing and control in the controller 170.

In addition, the storage 140 may perform a function for temporarily storing image, voice, or data signals output from the external device interface 135 or the network interface 133, and may store information on a predetermined image through a channel memory function.

The storage 140 may store an application or an application list input from the external device interface 135 or the network interface 133.

The display device 100 may play content files (e.g., video files, still image files, music files, document files, application files, etc.) stored in the storage 140, and may provide the content files to a user.

The user input 150 may transmit signals input by a user to the controller 170, or may transmit signals from the controller 170 to a user. For example, the user input 150 may receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR communication methods.

In addition, the user input 150 may transmit, to the controller 170, control signals input from local keys such as a power key, a channel key, a volume key, and a setting key.

Image signals that are image-processed by the controller 170 may be input to the display 180 and displayed as images corresponding to the image signals. In addition, image signals that are image-processed by the controller 170 may be input to an external output device through the external device interface 135.

Voice signals processed by the controller 170 may be output to the audio output 185. In addition, voice signals processed by the controller 170 may be input to the external output device through the external device interface 135.

Additionally, the controller 170 may control overall operations of the display device 100.

In addition, the controller 170 may control the display device 100 by a user command or an internal program input through the user input 150, and may access the network to download a desired application or application list into the display device 100.

The controller 170 may output channel information selected by a user together with the processed image or voice signals through the display 180 or the audio output 185.

In addition, the controller 170 may output image signals or voice signals of an external device such as a camera or a camcorder, which are input through the external device interface 135, through the display 180 or the audio output 185, according to an external device image playback command received through the user input 150.

Moreover, the controller 170 may control the display 180 to display images, and may control the display 180 to display broadcast images input through the tuner 131, external input images input through the external device interface 135, images input through the network interface, or images stored in the storage 140. In this case, an image displayed on the display 180 may be a still image or video and also may be a 2D image or a 3D image.

Additionally, the controller 170 may play content stored in the display device 100, received broadcast content, and external input content input from the outside, and the content may be in various formats such as broadcast images, external input images, audio files, still images, accessed web screens, and document files.

Moreover, the wireless communicator 173 may perform wired or wireless communication with an external device. The wireless communicator 173 may perform short-range communication with an external device. For this, the wireless communicator 173 may support short-range communication by using at least one of Bluetooth™, Bluetooth Low Energy (BLE), Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communicator 173 may support wireless communication between the display device 100 and a wireless communication system, between the display device 100 and another display device 100, or between networks including the display device 100 and another display device 100 (or an external server) through wireless area networks. The wireless area networks may be wireless personal area networks.

Herein, the other display device 100 may be a mobile terminal such as a wearable device (for example, a smart watch, a smart glass, and a head mounted display HMD)) or a smartphone, which is capable of exchanging data (or inter-working) with the display device 100. The wireless communicator 173 may detect (or recognize) a wearable device capable of communication around the display device 100. Furthermore, if the detected wearable device is a device authenticated to communicate with the display device 100, the controller 170 may transmit at least a portion of data processed in the display device 100 to the wearable device through the wireless communicator 173. Therefore, a user of the wearable device may use the data processed by the display device 100 through the wearable device.

The voice acquirer 175 may acquire audio. The voice acquirer 175 may include at least one microphone and may acquire audio around the display device 100 through the microphone.

The display 180 may convert image signals, data signals, or on-screen display (OSD) signals, which are processed in the controller 170, or images signals or data signals, which are received in the external device interface 135, into R, G, and B signals to generate driving signals.

The display device 100 illustrated in FIG. 1 is only an embodiment of the present disclosure, and thus, some of the illustrated components may be integrated, added, or omitted depending on the specification of the display device 100 that is actually implemented.

That is, if necessary, two or more components may be integrated into one component, or one component may be divided into two or more components. Additionally, a function performed by each block is to describe an embodiment of the present disclosure and its specific operation or device does not limit the scope of the present disclosure.

According to another embodiment of the present disclosure, unlike FIG. 1, the display device 100 may receive images through the network interface 133 or the external device interface 135 and play them without including the tuner 131 and the demodulator 132.

For example, the display device 100 may be divided into an image processing device such as a set-top box for receiving broadcast signals or contents according to various network services and a content playback device for playing content input from the image processing device.

In this case, an operating method of a display device according to an embodiment of the present disclosure described below may be performed by one of the display device described with reference to FIG. 1, an image processing device such as the separated set-top box, and a content playback device including the display 180 and the audio output 185.

The audio output 185 receives the audio-processed signal from the controller 170 to output an audio signal.

The power source supply 190 supplies the corresponding power to the entire display device 100. Particularly, power may be supplied to the controller 170 that is capable of being implemented in the form of a system on chip (SOC), the display 180 for displaying an image, the audio output 185 for outputting audio, and the like.

Specifically, the power source supply 190 may include a converter that converts AC power to DC power and a DC/DC converter that converts a level of the DC power.

A remote control device according to an embodiment of the present disclosure will be described with reference to FIGS. 2 and 3.

Figure 2:
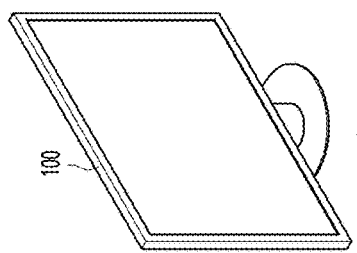
FIG. 2 is a block diagram illustrating a remote control device according to an embodiment of the present disclosure.
Figure 2:
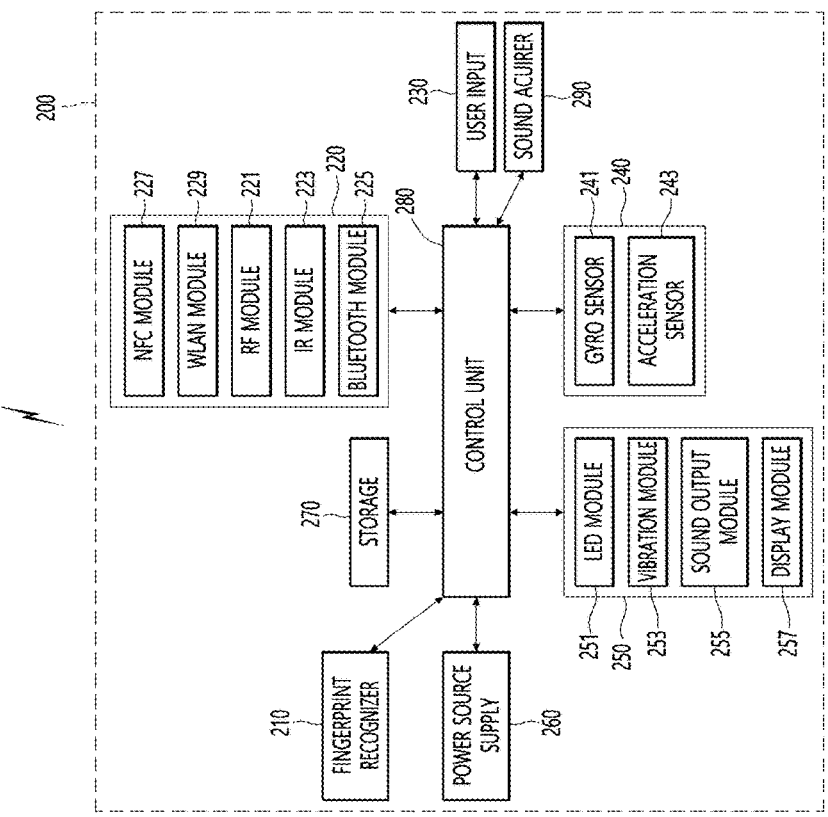
Figure 3:
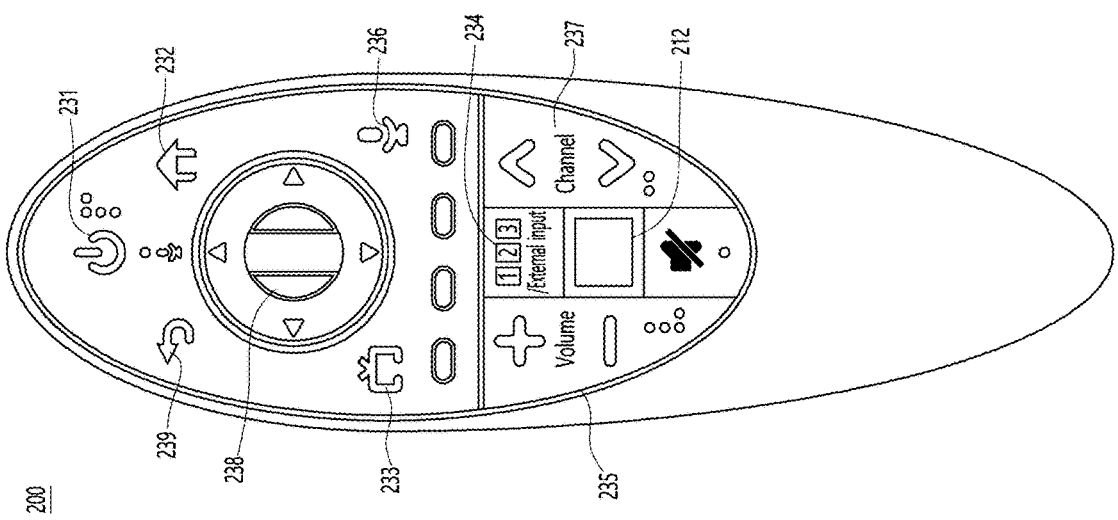
FIG. 3 is a view illustrating an example of the configuration of the remote control device according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 may include a fingerprint recognizer 210, a wireless communicator 220, a user input 230, a sensor 240, an output 250, a power source supply 260, a storage 270, a controller 280, and a sound acquirer 290.

Referring to FIG. 2, the wireless communicator 220 transmits/receives signals to/from an arbitrary any one of display devices according to the above-mentioned embodiments of the present disclosure.

The remote control device 200 may include a radio frequency (RF) module 221 capable of transmitting or receiving signals to or from the display device 100 according to an RF communication standard, and an IR module 223 capable of transmitting or receiving signals to or from the display device 100 according to an IR communication standard. In addition, the remote control device 200 may include a Bluetooth module 225 capable of transmitting or receiving signals to or from the display device 100 according to a Bluetooth communication standard. In addition, the remote control device 200 may include an NFC module 227 capable of transmitting or receiving signals to or from the display device 100 according to an NFC communication standard, and a wireless LAN (WLAN) module 229 capable of transmitting or receiving signals to or from the display device 100 according to a WLAN communication standard.

In addition, the remote control device 200 may transmit signals containing information on the movement of the remote control device 200 to the display device 100 through the wireless communicator 220.

Moreover, the remote control device 200 may receive signals transmitted from the display device 100 through the RF module 221 and if necessary, may transmit a command for power on/off, channel change, and volume change to the display device 100 through the IR module 223.

The user input 230 may be configured with a keypad, a button, a touch pad, or a touch screen. A user may operate the user input 230 to input a command relating to the display device 100 to the remote control device 200. If the user input 230 includes a hard key button, a user may input a command relating to the display device 100 to the remote control device 200 through the push operation of the hard key button. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, a confirmation button 238, and a back button 239.

The fingerprint recognition button 212 may be a button for recognizing a user's fingerprint. According to an embodiment of the present disclosure, the fingerprint recognition button 212 may perform a push operation and receive a push operation and a fingerprint recognition operation. The power button 231 may be a button for turning on/off the power of the display device 100. The home button 232 may be a button for moving to the home screen of the display device 100. The live button 233 may be a button for displaying live broadcast programs. The external input button 234 may be a button for receiving an external input connected to the display device 100. The volume control button 235 may be a button for controlling a volume output from the display device 100. The voice recognition button 236 may be a button for receiving user's voice and recognizing the received voice. The channel change button 237 may be a button for receiving broadcast signals of a specific broadcast channel. The confirmation button 238 may be a button for selecting a specific function, and the back button 239 may be a button for returning to a previous screen. FIG. 2 is described again.

If the user input 230 includes a touch screen, a user may touch a soft key of the touch screen to input a command relating to the display device 100 to the remote control device 200. In addition, the user input 230 may include various kinds of input interfaces operable by a user, for example, a scroll key and a jog key, and this embodiment does not limit the scope of the present disclosure.

The sensor 240 may include a gyro sensor 241 or an acceleration sensor 243. The gyro sensor 241 may sense information on the movement of the remote control device 200.

For example, the gyro sensor 241 may sense information on an operation of the remote control device 200 on the basis of x, y, and z axes and the acceleration sensor 243 may sense information on a movement speed of the remote control device 200. Moreover, the remote control device 200 may further include a distance measurement sensor that senses a distance with respect to the display 180 of the display device 100.

The output 250 may output image or voice signals in response to the operation of the user input 230, or may output image or voice signals corresponding to signals transmitted from the display device 100. A user may recognize whether the user input 230 is operated or the display device 100 is controlled through the output 250.

For example, the output 250 may include an LED module 251 for flashing, a vibration module 253 for generating vibration, a sound output module 255 for outputting sound, or a display module 257 for outputting an image, if the user input 230 is manipulated or signals are transmitted/received to/from the display device 100 through the wireless communicator 220.

Additionally, the power source supply 260 supplies power to the remote control device 200 and if the remote control device 200 does not move for a predetermined time, stops the power supply, so that power waste may be reduced. The power source supply 260 may resume the supply of power if a predetermined key provided at the remote control device 200 is operated.

The storage 270 may store various kinds of programs and application data required to control or operate the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 may store, in the storage 270, information on a frequency band for transmitting/receiving signals to/from the display device 100 paired with the remote control device 200 and refer to it.

The controller 280 controls general matters relating to the control of the remote control device 200. The controller 280 may transmit a signal corresponding to a predetermined key operation of the user input 230 or a signal corresponding to the movement of the remote control device 200 sensed by the sensor 240 to the display device 100 through the wireless communicator 220.

In addition, the sound acquirer 290 of the remote control device 200 may acquire voice.

The sound acquirer 290 may include at least one microphone and acquire voice through the microphone.

Figure 4:
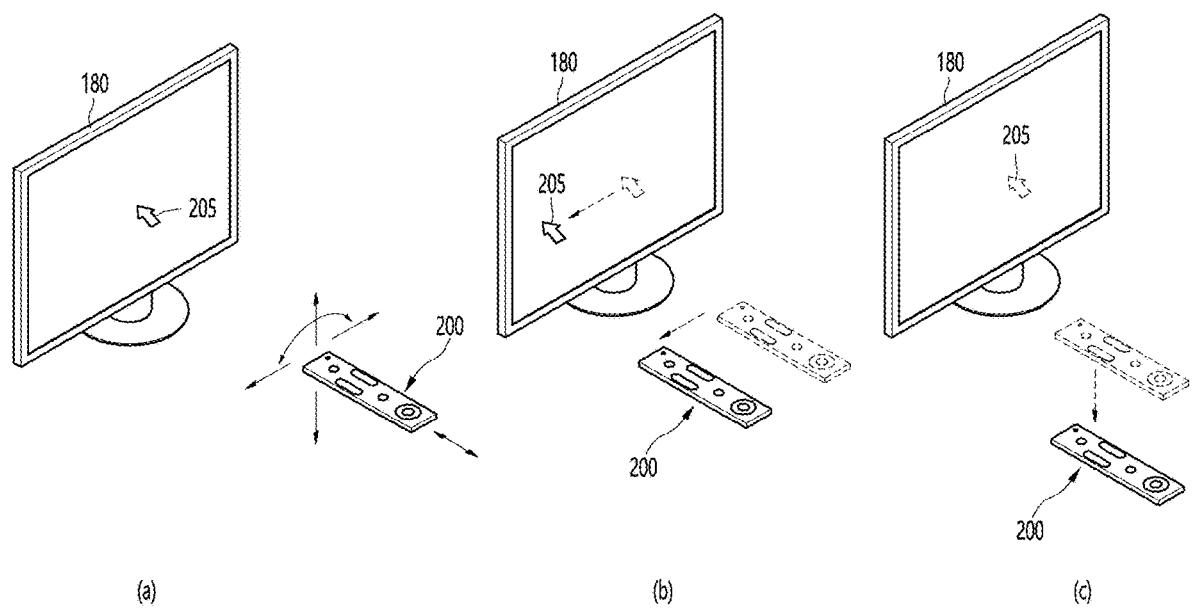
FIG. 4 is a view illustrating an example of utilization of the remote control device according to an embodiment of the present disclosure.

Next, FIG. 4 is described.

FIG. 4 is a view illustrating an example of utilizing a remote control device according to an embodiment of the present disclosure.

(a) of FIG. 4 illustrates that a pointer 205 corresponding to the remote control device 200 is displayed on the display 180.

A user may move or rotate the remote control device 200 vertically or horizontally. The pointer 205 displayed on the display 180 of the display device 100 may correspond to the movement of the remote control device 200. Since the corresponding pointer 205 is moved and displayed according to a movement on a 3D space as show in the drawing, the remote control device 200 may be referred to as a spatial remote control device.

(b) of FIG. 4 illustrates that if a user moves the remote control device 200, the pointer 205 displayed on the display 180 of the display device 100 is moved to the left according to the movement of the remote control device 200.

Information on the movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 to match the calculated coordinates.

In (c) of FIG. 4A, it is illustrated that a user moves the remote control device 200 away from the display 180 while pressing a specific button in the remote control device 200. Thus, a selected region in the display 180 corresponding to the pointer 205 may be zoomed in and displayed in an enlarged size.

Conversely, when the user moves the remote control device 200 close to the display 180, the selected region in the display 180 corresponding to the pointer 205 may be zoomed out and displayed to be reduced.

On the other hand, when the remote control device 200 moves away from the display 180, the selected region may be zoomed out, and when the remote control device 200 moves close to the display 180, the selected region may be zoomed in.

In addition, in a state in which a specific button in the remote control device 200 is being pressed, recognition of up, down, left, or right movements may be excluded. That is, when the remote control device 200 moves away from or close to the display 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Furthermore, a pointer in this specification means an object displayed on the display 180 in response to an operation of the remote control device 200. Therefore, in addition to the arrow form displayed as the pointer 205 in the drawing, various forms of objects are possible. For example, the above concept includes a point, a cursor, a prompt, and a thick outline. Then, the pointer 205 may be displayed in correspondence to one point of a horizontal axis and a vertical axis on the display 180 and also may be displayed in correspondence to a plurality of points such as a line and a surface.

The controller 170 may also be referred to as the processor 170. The wireless communicator 173 may also be referred to as a communication interface 173. In addition, the storage 140 may also be referred to as a memory 140.

Figure 5:
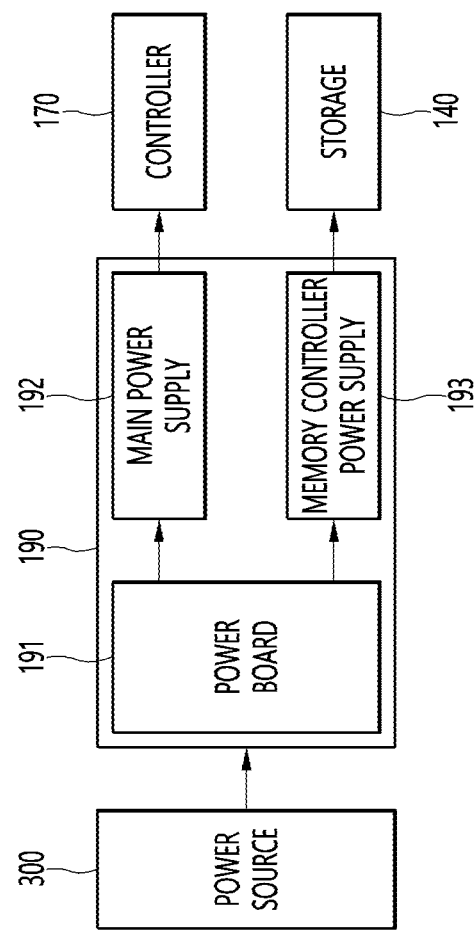
FIG. 5 is a block diagram of a power source supply according to an embodiment of the present disclosure.

FIG. 5 is a block diagram of a power source supply according to an embodiment of the present disclosure.

The power supply 190 may receive power input from an external power source 300. The external power source 300 may supply alternating current (AC) power and may have a voltage range of 100 V to 240 V.

The power supply 190 may include a power board 191. The power board 191 may receive the power from the external power source 300. The power board 191 may distribute and supply a required power capacity to the main power supply 192 and the memory controller power supply 193.

In addition, the power supply 190 may include a main power supply 192 that supplies power required for the controller 170. For example, the main power supply 192 may supply power to the main board of the controller 170.

In addition, the power supply 190 may include a memory controller power supply 193 that supplies power required for the memory controller of the storage 170. For example, the memory controller power supply 193 may supply power to the memory controller of the storage 170. The memory controller may be an embedded multi-media controller (eMMC) and may be referred to as a package in which a flash memory and a flash memory controller are combined on the same silicon die.

Figure 6:
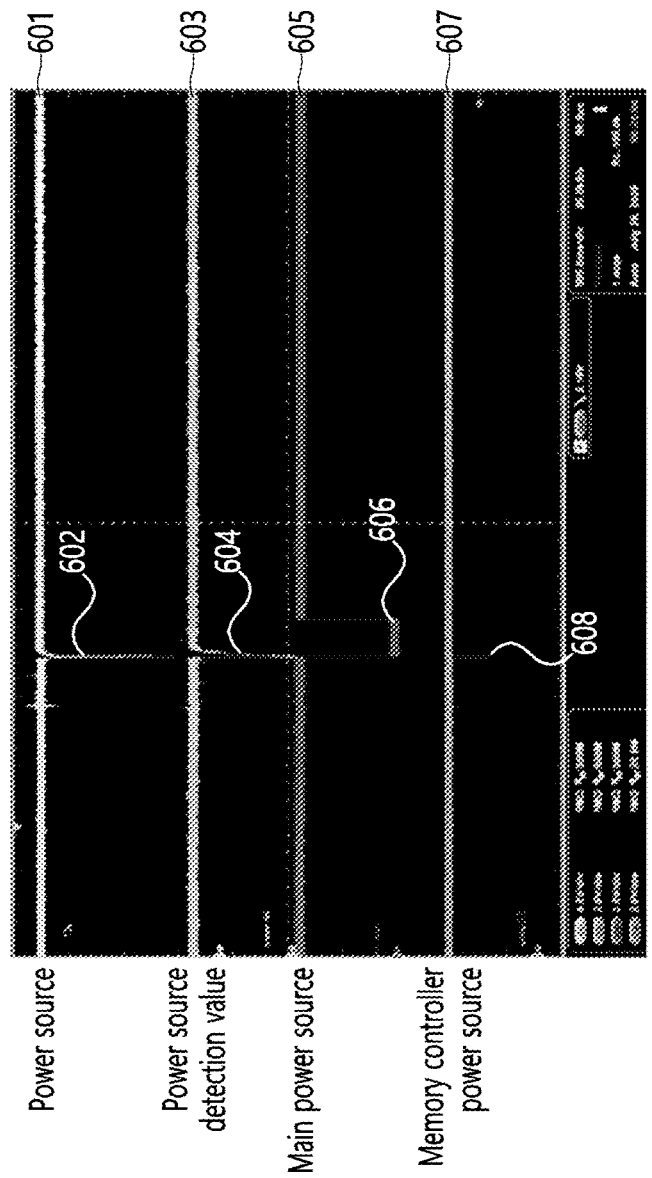
FIG. 6 is a view for explaining a booting error of a memory controller when an instantaneous voltage drop occurs.

FIG. 6 is a view for explaining a booting error of the memory controller when the instantaneous voltage drop occurs.

Referring to FIG. 6, an instantaneous voltage drop 602 may occur in a power supply voltage graph 601 that shows a voltage of the power supplied from the external power source 300.

The processor 170 may include a power detector that detects the voltage of the supplied power. The processor 170 may detect the voltage of the supplied power. When the voltage drop 602 occurs in the voltage of the power supplied from the external power source 300, the processor 170 may detect a drop 604 in detected power detection value while tracking the detected power detection value 603. Thus, the processor 170 may detect the voltage of the power supplied from the external power source 300 to detect the instantaneous voltage drop.

The processor 170 may reset main integrated circuits (ICs) when the voltage drop is detected. The main integrated circuits (ICs) may be components included in the main board of the processor 170 and may also include the processor 170. In this case, the voltage of the power supplied from the main power supply 192 may be converted from an existing state to another state and then returned to its original state. For example, the voltage value 605 of the power supplied from the main power supply 192 may have a voltage value 606 less than the existing voltage value and then return to its original state.

However, when the processor 170 does not forcibly reset the memory controller of the storage 140, the voltage value 607 of the power supplied to the memory controller only has a weak voltage drop 608. For example, when the voltage value of the memory controller is 3.3 V, a voltage drop of up to 1.668V occurs. Thus, when the main integrated circuits (ICs) are reset, and the processor 170 attempts to communicate with the memory controller of the storage 140, communication failure and booting errors may occur.

Therefore, there is a need to solve the problem in which the communication between the storage 140 and the controller 170 is not performed because the memory controller is not reset even when the main IC is reset after the instantaneous voltage drop.

Figure 7:
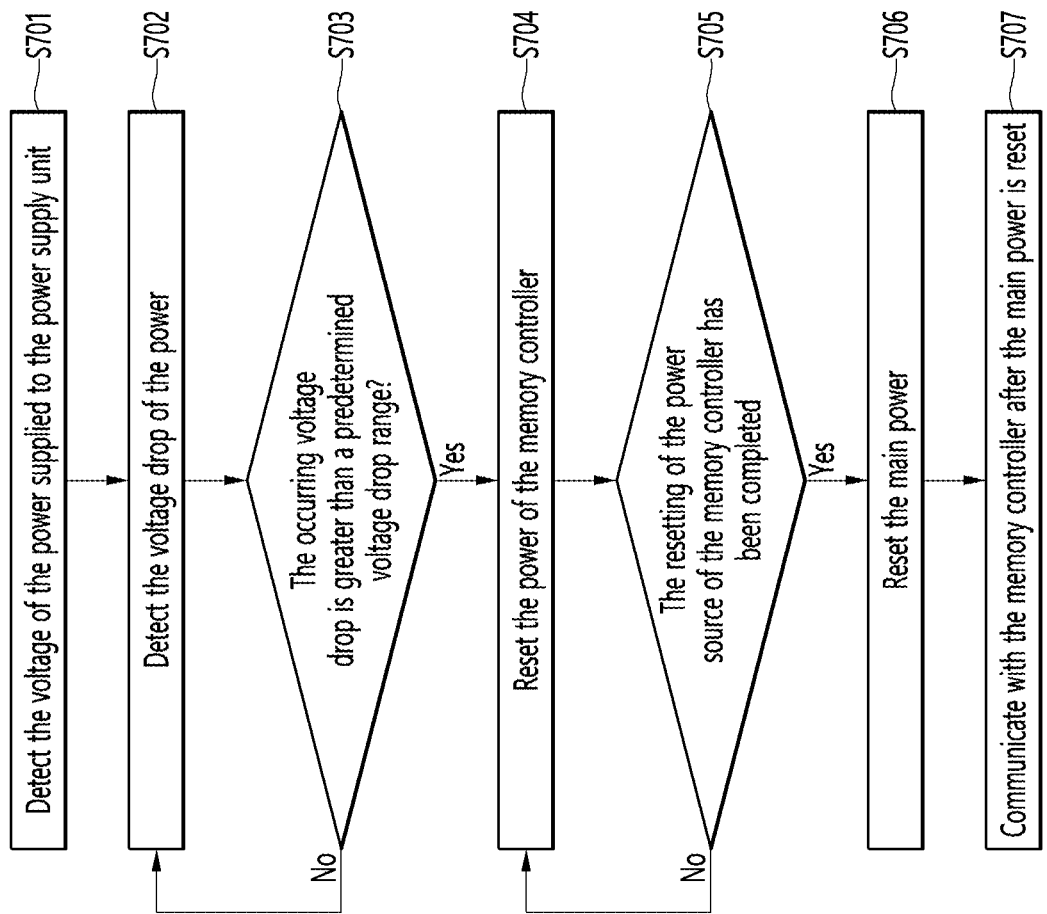
FIG. 7 is a view for explaining a booting error of a memory controller when an instantaneous voltage drop occurs.

FIG. 7 is a view for explaining a booting error of the memory controller when the instantaneous voltage drop occurs.

The processor 170 may detect the voltage of the power supplied to the power supply 190 (S701).

The processor 170 may include a power detector that detects the voltage of the power. The power detector may detect the voltage of the power supplied from the external power source 300.

The processor 170 may detect the voltage drop of the power supplied from the external power source 300 (S702).

The voltage drop may mean an instantaneous decrease in voltage. The voltage drop may occur due to natural phenomena such as lightning or ice melt, or due to abnormalities in power network through which power is supplied. In addition, it may also occur in certain regions or countries in which power supply is unstable.

The processor 170 may determine whether the occurring voltage drop is greater than a predetermined voltage drop range (S703).

The processor 170 may determine whether the power supplied from the external power source 300 to the power supply 190 has a voltage drop greater than the predetermined voltage drop range.

For example, the processor 170 may determine whether the voltage value of the power supplied from the external power source 300 decreases by more than 70%. Thus, it is possible to determine whether it is a voltage drop that does not affect the operation of the display device 100 or whether it is a voltage drop that affects the operation of the display device 100.

The processor 170 may reset the power of the memory controller (S704).

When the voltage drop is detected, the processor 170 may reset the power source of the memory controller within a predetermined time. In this case, the predetermined time may be a time before the power source of the main IC is reset. For example, if the voltage drop is detected, the processor 170 may reset the power source of the memory controller before the power of the main IC is reset. That is, the processor 170 may reset the power source of the memory controller before resetting the main power.

In addition, when the voltage drop greater than the predetermined voltage drop range occurs in the power supplied from the external power source 300, the processor 170 may reset the power of the memory controller within the predetermined time.

The processor 170 may determine whether the resetting of the power source of the memory controller has been completed (S705).

In addition, the processor 170 may determine whether the resetting of the power source of the memory controller is complete on the basis of the voltage value of the power supplied to the memory controller.

For example, the processor 170 may determine that the resetting of the power source of the memory controller is complete when the voltage value of the power supply of the memory controller increases from a predetermined first reference value to a predetermined second reference value.

In addition, for example, the processor 170 may determine that the power of the memory controller has been reset when the resetting of the power source of the memory controller is complete so that the voltage value of the power source of the memory controller returns to its original state.

In addition, for example, when the voltage value of the power source of the memory controller of the processor 170 is greater than or equal to the predetermined voltage value, it may be determined that the power source of the memory controller has been reset. The processor 170 may reset the main power (S706).

The processor 170 may reset the power source of the main integrated circuit (IC). In this case, the voltage of the power supplied from the main power supply 192 may be converted from an existing state to another state and then returned to its original state. For example, the voltage value of the power supplied from the main power supply may have a voltage value less than the existing voltage value and then return to its original state.

The processor 170 may communicate with the memory controller after the main power is reset (S707).

The processor 170 may operate the memory controller by communicating with the memory controller after the main IC power is reset. In this case, since the memory controller is reset before the main power reset is complete, the communication between the processor 170 and the memory controller may be performed without errors.

Figure 8:
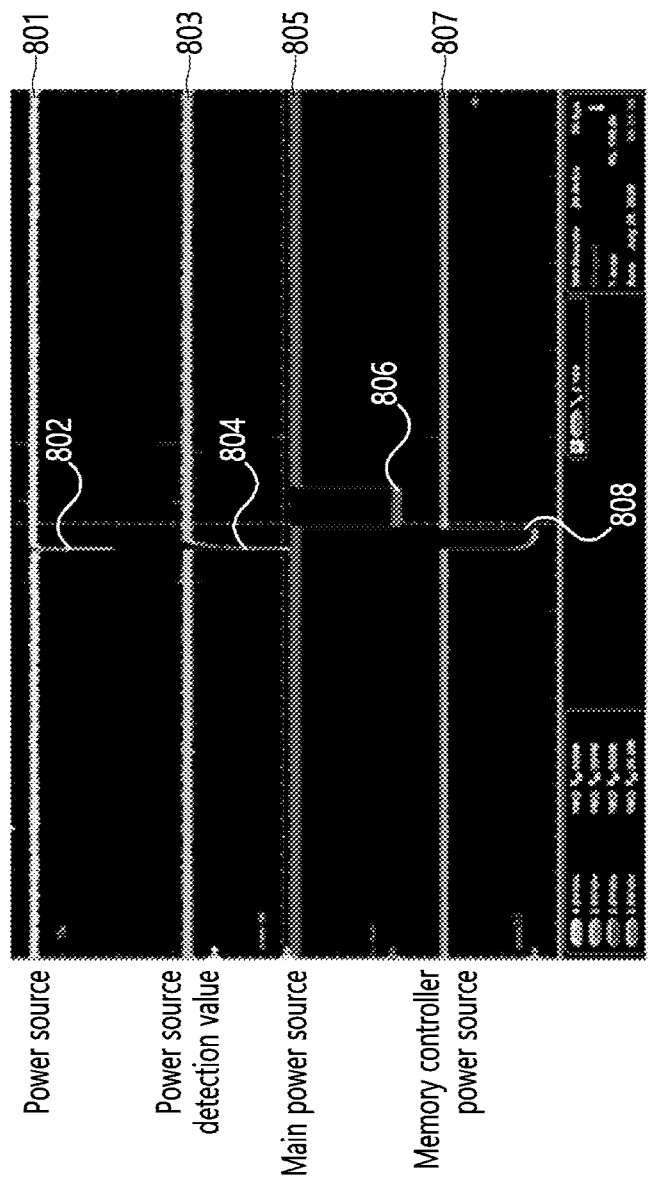
FIG. 8 is a view for explaining a method for preventing an error of a memory controller according to an embodiment of the present disclosure.

FIG. 8 is a view for explaining a method for preventing an error of a memory controller according to an embodiment of the present disclosure.

Referring to FIG. 8, an instantaneous voltage drop 802 may occur in a power supply voltage graph 801 that shows a voltage of power supplied from an external power source 300.

The processor 170 may detect the voltage of the supplied power. The processor 170 may track the detected power value 803 to detect that the detected power value has dropped (804). Thus, the processor 170 may detect the voltage of the power supplied from the external power source 300 to detect the instantaneous voltage drop.

When the voltage drop is detected, the processor 170 may reset the power source of the memory controller within a predetermined time. In this case, the predetermined time may be a time before the power source of the main IC is reset. For example, if the voltage drop is detected, the processor 170 may reset the power source of the memory controller before the power of the main IC is reset.

For example, referring to a voltage value 807 of the memory controller power source, when the voltage drop is detected, the processor 170 may cut off the power supplied from the memory controller power supply 193 before the main power is reset to reset the power source of the memory controller (808).

The processor 170 may reset the power source of the main integrated circuit (IC).

In this case, the voltage value 805 of the power supplied from the main power supply 192 may be converted from an existing state to another state 806 and then returned to its original state.

The above-disclosed subject matter is to be considered illustrative, and not restrictive, and the appended claims are intended to cover all such modifications, enhancements, and other embodiments, which fall within the true spirit and scope of the present invention.

Thus, the embodiment of the present invention is to be considered illustrative, and not restrictive, and the technical spirit of the present invention is not limited to the foregoing embodiment.

Therefore, the scope of the present invention is defined not by the detailed description of the invention but by the appended claims, and all differences within the scope will be construed as being included in the present invention.

The invention claimed is:

1. A display device comprising:
   a power source supply configured to receive power from an external power source; and
   a processor configured to detect a voltage of the power supplied from the power source supply, detect a voltage drop of the supplied power on the basis of the detected voltage of the power, and reset power source of a memory controller and a main power source within a predetermined time when the voltage drop is detected,
   wherein the processor is configured to:
   determine whether the detected voltage of the power has a voltage drop above a predetermined drop range; and
   reset the power source of the memory controller within the predetermined time when the voltage drop above the predetermined voltage drop range occurs in the detected voltage of the power.

2. The display device according to claim 1, wherein the processor is configured to reset the power source of the memory controller before the main power source is reset.

3. The display device according to claim 1, wherein the processor is configured to:
   determine whether the resetting of the power source of the memory controller is complete; and
   reset the main power source when the resetting of the power source of the main controller is complete.

4. The display device according to claim 3, wherein the processor is configured to determine whether the resetting of the power source of the memory controller is complete on the basis of the voltage value of the power source supplied from the memory controller.

5. The display device according to claim 1, wherein the processor is configured to perform communication with the memory controller after the main power source is reset.

6. A method for preventing an error, the method comprising:
   receiving power from an external power source;
   detecting a voltage of the power;
   detecting a voltage drop of the power on the basis of detected voltage of the power;
   resetting a power source of a memory controller within a predetermined time when the voltage drop is detected; and
   resetting a main power source,
   wherein the resetting of the power source of the memory controller comprises:
   determining whether the detected voltage of the power has a voltage drop above a predetermined voltage drop range; and
   resetting a power source of the memory controller when the voltage drop above the predetermined voltage drop range occurs in the detected voltage of the power.

7. The method according to claim 6, wherein the resetting of the power source of the memory controller comprises resetting the power source of the memory controller before resetting the main power source.

8. The method according to claim 6, wherein the resetting of the main power source comprises:

determining whether the resetting of the power source of the memory controller is complete; and resetting the main power source when the resetting of the power source of the memory controller is complete.

9. The method according to claim 8, wherein the determining of whether the resetting of the power source of the memory controller is complete comprises determining whether the resetting of the power source of the memory controller is complete on the basis of a voltage value of the power source supplied to the memory controller.

10. The method according to claim 6, further comprising performing communication with the memory controller after the main power source is reset.

* * * * *